United States Patent
Rahman et al.

(10) Patent No.: US 10,498,500 B2
(45) Date of Patent: Dec. 3, 2019

(54) NETWORK NODE, COMMUNICATION DEVICE AND METHODS THEREIN FOR HANDLING DYNAMIC SUBFRAME CONFIGURATIONS

(71) Applicant: Telefonaktiebolaget LM Ericsson (publ), Stockholm (SE)

(72) Inventors: Imadur Rahman, Sollentuna (SE); Muhammad Kazmi, Sundbyberg (SE); Ali Behravan, Stockholm (SE); Xinghua Song, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 96 days.

(21) Appl. No.: 15/510,764

(22) PCT Filed: Sep. 28, 2015

(86) PCT No.: PCT/SE2015/051015
§ 371 (c)(1),
(2) Date: Mar. 13, 2017

(87) PCT Pub. No.: WO2016/053164
PCT Pub. Date: Apr. 7, 2016

(65) Prior Publication Data
US 2017/0279567 A1    Sep. 28, 2017

Related U.S. Application Data

(60) Provisional application No. 62/056,690, filed on Sep. 29, 2014.

(51) Int. Cl.
*H04L 5/00*    (2006.01)
*H04W 88/18*    (2009.01)
(Continued)

(52) U.S. Cl.
CPC ............ *H04L 5/0001* (2013.01); *H04L 5/001* (2013.01); *H04L 5/1469* (2013.01); *H04L 12/28* (2013.01);
(Continued)

(58) Field of Classification Search
CPC ....... H04L 41/14; H04L 5/0001; H04L 5/001; H04L 5/0058; H04L 5/1469; H04L 12/28; H04W 88/181
See application file for complete search history.

(56) References Cited

U.S. PATENT DOCUMENTS

| | | | |
|---|---|---|---|
| 2003/0040311 A1* | 2/2003 | Choi | H04W 48/20 455/434 |
| 2004/0131029 A1* | 7/2004 | Tobe | H04M 15/8016 370/331 |

(Continued)

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.

(Continued)

*Primary Examiner* — Jenee Holland
(74) *Attorney, Agent, or Firm* — Patent Portfolio Builders, PLLC

(57) ABSTRACT

A network node, a communication device and methods therein, for handling dynamic uplink/downlink, UL/DL, subframe configurations when operating in Time Division Duplex, TDD. The network node obtains capability information indicating whether the communication device supports carrier aggregation and/or frequency band combination, and also indicating whether the communication device supports simultaneous reception and transmission of signals on different carriers or frequency bands. The network node (Continued)

then determines UL/DL subframe configurations for the communication device based on the obtained capability information such that the communication device is to use different UL/DL subframe configurations for different carriers or frequency bands, when certain conditions are fulfilled.

15 Claims, 6 Drawing Sheets

(51) Int. Cl.
   *H04L 12/28* (2006.01)
   *H04L 5/14* (2006.01)
   *H04L 12/24* (2006.01)
(52) U.S. Cl.
   CPC ......... *H04W 88/181* (2013.01); *H04L 5/0058* (2013.01); *H04L 41/14* (2013.01)

(56) References Cited

U.S. PATENT DOCUMENTS

| | | | | |
|---|---|---|---|---|
| 2004/0229603 | A1* | 11/2004 | Sato | H04W 52/386 455/422.1 |
| 2006/0019665 | A1* | 1/2006 | Aghvami | H04W 16/32 455/444 |
| 2007/0121547 | A1* | 5/2007 | Huh | H04W 72/10 370/329 |
| 2008/0032725 | A1* | 2/2008 | Usuda | H04L 1/0002 455/509 |
| 2008/0132266 | A1* | 6/2008 | Usuda | H04W 28/22 455/522 |
| 2009/0239569 | A1* | 9/2009 | Dottling | H04W 52/243 455/522 |
| 2012/0044882 | A1* | 2/2012 | Kim | H04L 5/0058 370/329 |
| 2012/0063370 | A1* | 3/2012 | Worrall | H04W 48/12 370/280 |
| 2012/0176979 | A1* | 7/2012 | Kim | H04W 52/146 370/329 |
| 2012/0207112 | A1* | 8/2012 | Kim | H04W 52/146 370/329 |
| 2012/0214537 | A1* | 8/2012 | Kim | H04W 52/365 455/522 |
| 2012/0327821 | A1 | 12/2012 | Lin et al. | |
| 2013/0176953 | A1* | 7/2013 | Stern-Berkowitz | H04W 52/146 370/329 |
| 2014/0024380 | A1* | 1/2014 | Pedersen | H04W 52/243 455/438 |
| 2014/0092785 | A1* | 4/2014 | Song | H04L 1/00 370/280 |
| 2014/0146680 | A1* | 5/2014 | Wang | H04W 52/0206 370/236 |
| 2014/0286206 | A1* | 9/2014 | Song | H04W 16/10 370/280 |
| 2014/0335869 | A1* | 11/2014 | Choi | H04W 36/0072 455/438 |
| 2015/0131567 | A1* | 5/2015 | Fu | H04W 52/365 370/329 |
| 2015/0351052 | A1* | 12/2015 | Jeong | H04W 52/365 455/522 |
| 2016/0029326 | A1* | 1/2016 | Jeong | H04W 24/10 370/329 |
| 2016/0044556 | A1* | 2/2016 | Maguire | H04W 48/20 370/332 |
| 2016/0112968 | A1* | 4/2016 | Ahn | H04W 52/146 370/311 |
| 2016/0353343 | A1* | 12/2016 | Rahman | H04W 36/30 |
| 2017/0215157 | A1* | 7/2017 | Yang | H04B 7/26 |
| 2017/0279567 | A1* | 9/2017 | Rahman | H04L 5/001 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.2.0, 3GPP Organizational Partners, Jun. 2014, 215 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.2.0, 3GPP Organizational Partners, Jun. 2014, 365 pages.

Catt, "R1-112106: TDD Inter-band Carrier Aggregation," 3rd Generation Partnership Project (3GPP), TSG RAN WG1 Meeting #66, Aug. 22-26, 2011, 5 pages, Athens, Greece.

International Search Report and Written Opinion for International Patent Application No. PCT/SE2015/051015, dated Dec. 17, 2015, 11 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 1

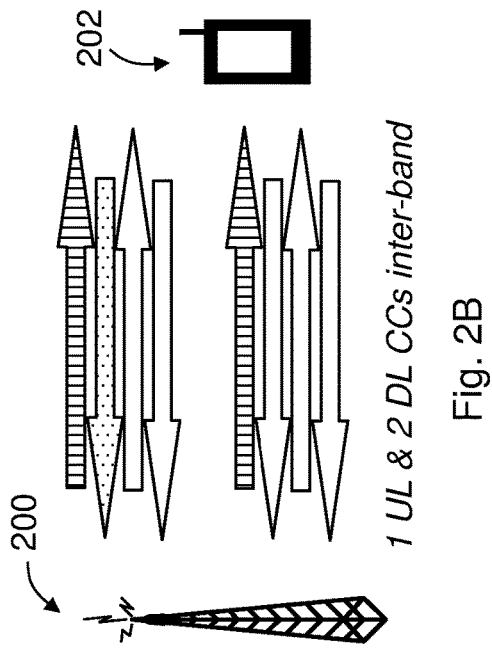
Fig. 2A
Rel-8 behavior
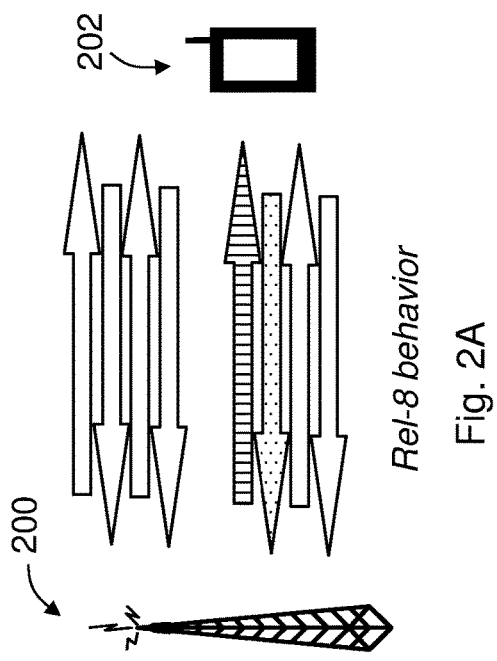
Fig. 2C
1 UL & 3 DL CCs inter-band
Fig. 2B
1 UL & 2 DL CCs inter-band
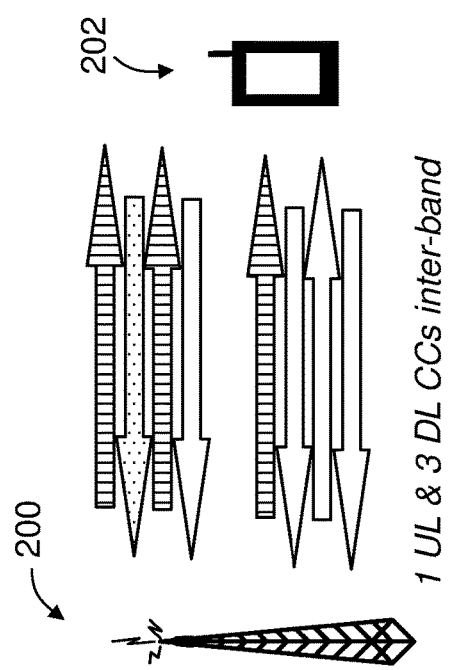
Fig. 2D
2 UL & 2 DL CCs inter-band

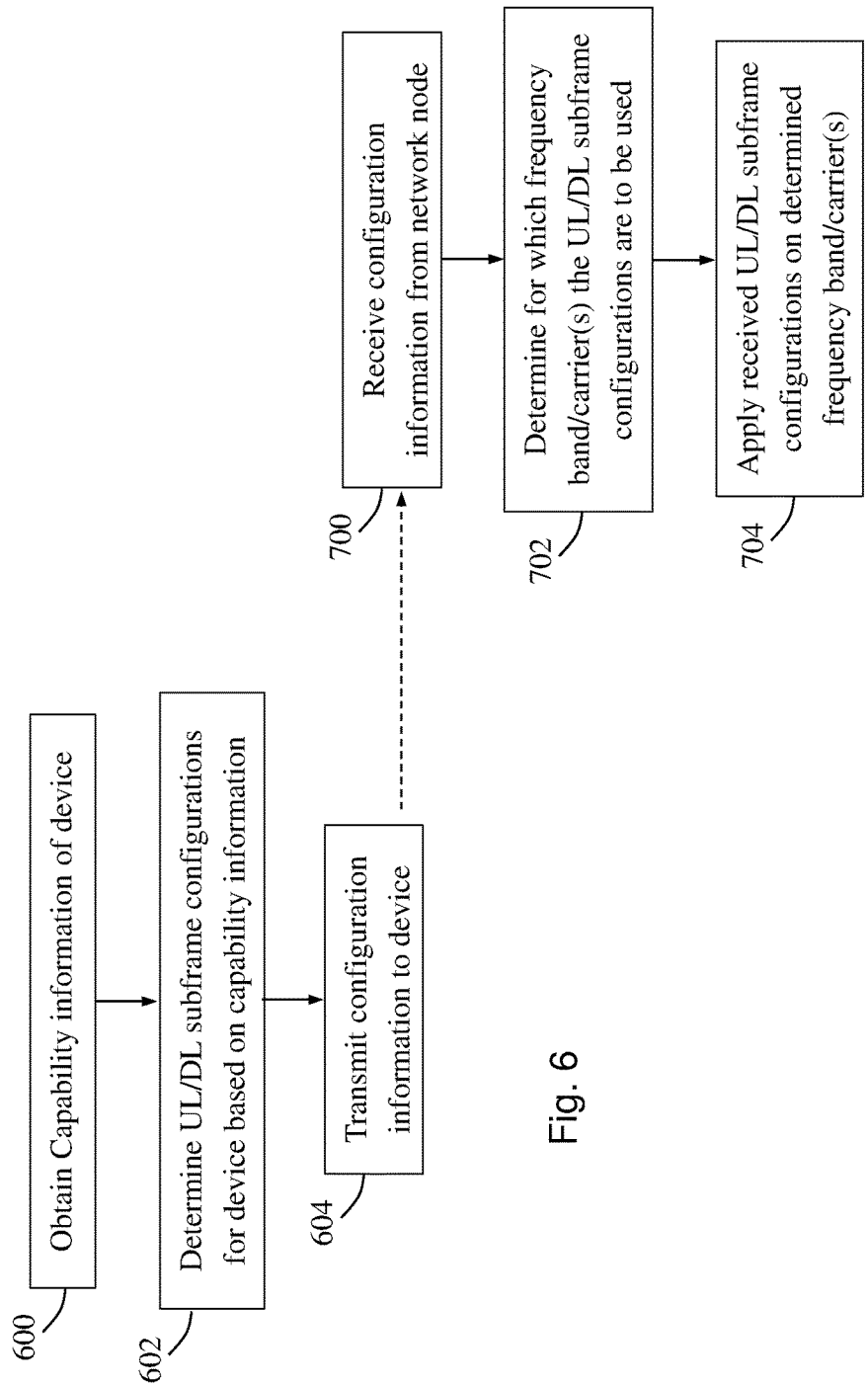

NETWORK NODE, COMMUNICATION DEVICE AND METHODS THEREIN FOR HANDLING DYNAMIC SUBFRAME CONFIGURATIONS

This application is a 35U.S.C. § 371 national phase filing of International Application No. PCT/SE2015/051015, filed Sep. 28, 2015, which claims the benefit of U.S. Provisional Application No. 62/056,690, filed Sep. 29, 2014, the disclosures of which are incorporated herein by reference in their entireties.

TECHNICAL FIELD

The present disclosure relates generally to a network node, a communication device and methods therein, for handling dynamic uplink/downlink, UL/DL, subframe configurations when operating in Time Division Duplex, TDD.

BACKGROUND

In a typical radio communications network, communication devices, also known as mobile stations, wireless devices, wireless terminals and/or User Equipments, UEs, communicate via a Radio Access Network, RAN, to one or more core networks. The radio access network covers a geographical area which is typically divided into cell areas, with each cell area being served by a base station, e.g. a radio base station, RBS, which in some networks may also be called, for example, a "NodeB" or "eNodeB". In this disclosure, the terms "network node", base station" and "eNB" are used interchangeably to represent a node in the network that is capable of communication radio signals with a communication device. Further, the terms "communication device", "UE" and "terminal" are used interchangeably to represent a communication device that is capable of communication radio signals with a network node of a radio access network.

A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole radio communications network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the $3^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

TDD Configurations

FIG. 1 shows an example of a table of UL/DL subframe configurations according to 3GPP TS 36.211, version 12.3.0. Here, it should be noted that for UL/DL subframe configuration {0}, measurement gaps with offsets 3 and 8 subframes relative to the frame border will be squeezed in between two UL subframes. Moreover, it should also be noted that for UL/DL subframe configurations {0, 1 and 6}, measurement gaps with offsets 2 and 7 subframes will be squeezed in between a special subframe and an UL subframe.

Time Division Duplex, TDD

Transmission and reception from a node, e.g. a communication device in a cellular system such as LTE, can be multiplexed in the frequency domain or in the time domain, or combinations thereof. In Frequency Division Duplex, FDD, downlink and uplink transmission take place in different, sufficiently separated, frequency bands. In Time Division Duplex, TDD downlink and uplink transmission take place in different, non-overlapping time slots. Thus, TDD can operate in unpaired spectrum e.g. using the same frequency band for both downlink and uplink transmissions, whereas FDD requires paired spectrum using separate frequency bands for the downlink and uplink transmissions.

Typically, the structure of the transmitted signal in a communication system is organized in the form of a frame structure. For example, LTE uses ten equally-sized subframes of length 1 ms per radio frame. In case of FDD operation, two carrier frequencies may be used, one for uplink transmission, $f_{UL}$, and one for downlink transmission, $f_{DL}$. At least with respect to the communication device in a cellular communication system, FDD may be either full duplex or half duplex. In the full duplex case, a communication device may be able to transmit and receive simultaneously, while in half-duplex operation, the communication device is not able to transmit and receive simultaneously. A half-duplex communication device is monitoring/receiving in the downlink except when explicitly being instructed to transmit in a certain subframe. In case of TDD operation, there is only a single carrier frequency and UL and DL transmissions are always separated in time also on a cell basis. As the same carrier frequency is used for both UL and DL transmission, both the base station and the communication devices need to switch from transmission to reception and vice versa. According to an aspect of any TDD system is to provide the possibility for a sufficiently large guard time where neither DL nor UL transmissions occur. This is required to avoid interference between UL and DL transmissions. This guard time may be provided by special subframes, e.g. subframe 1 and, in some cases, subframe 6, which are split into three parts: a downlink part, DwPTS, a guard period, GP, and an uplink part, UpPTS. The remaining subframes are either allocated to UL or DL transmission.

TDD allows for different asymmetries in terms of the amount of resources allocated for UL and DL transmission, respectively, by means of different UL/DL configurations. In LTE, there are seven different configurations as shown in FIG. 1, which may be employed to achieve different amounts of resources for UL and DL transmission.

Dynamic TDD

In future radio communication networks, it is envisioned that there will be more and more localized traffic, where most of the communication devices will be operating in hotspots, or in indoor areas, or in residential areas. These communication devices may be located in clustered nature and may produce different UL and DL traffic at different times. This essentially means that a dynamic feature to adjust the UL and DL resources to instantaneous (or near instantaneous) traffic variations would be required in future local area cells. TDD has a potential feature where the usable band can be configured in different time slots to either the UL or DL. This allows for the above-mentioned asymmetric UL/DL allocation, which is a TDD-specific property not possible in FDD. As shown in FIG. 1, there are seven different UL/DL configurations in case of TDD, providing DL resources in the range of 40%-90%.

In current radio communication networks, the UL/DL configuration is semi-statically configured, which means that it may not match the instantaneous traffic situation. This will result in inefficient resource utilization in both UL and DL, especially in cells with a small number of communication devices. Thus, a "dynamic" TDD should be introduced to which may configure the TDD UL/DL subframe configurations according to current traffic situations in order to optimize user experience. Furthermore, such a "dynamic" TDD approach may also be utilized to reduce network energy consumption.

Existing radio communication networks employing TDD typically use fixed TDD UL/DL subframe configurations, where some subframes are always UL and some subframes are always DL. This limits the flexibility in adopting the UL/DL asymmetry to varying traffic situations.

One possibility to increase the flexibility of a TDD system, at least in some scenarios, is summarized below where each subframe (or part of a subframe) belongs to one of three different types:

Downlink subframes used (among other) for transmission of DL data, system information, control signaling and hybrid-ARQ feedback in response to uplink transmission activity. Here, the communication device is monitoring Physical Downlink Control CHannel, PDCCH, channel, i.e. the communication device may receive scheduling assignments and scheduling grants. Special subframes are similar to DL subframes except that in addition to the DL part, the special subframe also include a guard period, as well as, a small UL part in the end of the subframe to be used for random access or sounding.

Uplink subframes used (among other) for transmission of UL data, UL control signalling (e.g. channel-status reports), and hybrid-ARQ feedback in response to DL data transmission activity. Data transmission on the Physical Uplink Shared CHannel, PUSCH, in UL subframes are controlled by UL scheduling grants received on a PDCCH in an earlier subframe.

Flexible subframes, which also may be referred to as "Don't Know What They Are", DKWTA, subframes, are possibly to use for UL or DL transmissions as determined by scheduling assignments/grants.

In a dynamic TDD system, which also may be referred to as an enhanced Interference Mitigation and Traffic adaptation, eIMTA, system, a group of subframes are fixed subframes. This means that they are either UL or DL subframes in all radio frames, while others are flexible subframes, i.e. in some radio frames they may be UL subframes, while in other radio frames the same subframe may be a DL subframe or even special subframe. The assignment of the UL or DL direction is done in a dynamic manner on the basis of frame or multiple of frames. Flexible subframes are also called interchangeably as dynamic subframes. Throughout this disclosure, the term eIMTA generally indicates the use of UL/DL subframe configurations which contain at least one flexible subframe. The mechanism of this adaptation is explained in 3GPP TS 36.300, version 12.2.0.

For UL scheduling and HARQ timing, the communication device follows a predetermined reference UL/DL subframe configuration based on the UL/DL subframe configuration provided in System Information Block 1, SIB1. For DL HARQ timing, the communication device follows the reference UL/DL subframe configuration provided through dedicated signaling. DL subframes in the reference UL/DL subframe configuration provided in SIB1 remain unchanged, whereas only a subset of UL and special subframes may be reconfigured to DL subframes. In E-UTRAN, the network node may send a L1 signalling to the communication device on PDCCH on the PCell to indicate which UL/DL subframe configuration (defined in 3GPP TS 36.211, version 12.3.0) is currently used for one or more serving cell(s). This UL/DL subframe configuration provided by the L1 signalling applies for a Radio Resource Control, RRC, configured number of radio frames.

The periodicity of eIMTA configurations may be 10 ms, 20 ms, 40 ms, or 80 ms. The UE is configured to operate in eIMTA by means a so-called RRC information element, IE, defined in 3GPP TS 36.331, which is referred to as:

EIMTA-MainConfig

The IE EIMTA-MainConfig is used to specify the RNTI used for eIMTA and the subframes used for eIMTA reconfiguration command transmission.

While, in theory, "dynamic" UL/DL subframe configuration should also provide a good match of allocated resources to instantaneous traffic, different UL and DL transmission in neighboring cells may also cause specific issues related to handover, HO, measurements by the communication devices. It should also be noted that dynamic TDD may also be referred to as "reconfigurable TDD" (or UL/DL allocation or subframe configuration), "flexible TDD" (or UL/DL allocation or subframe configuration), "adaptive TDD" (or UL/DL allocation or subframe configuration), etc., and may be interchangeably used herein and elsewhere.

Thus, in "dynamic" TDD, one or more 'dynamic subframes', or 'flexible subframes', may be used in different directions of transmission, i.e. UL or DL, in different cells, which cells may belong to the same frequency band/carrier or different frequency bands/carriers. Furthermore, the direction of one or more of these 'dynamic subframes' or 'flexible subframes' in a particular cell may be changed over time, e.g. as fast as every radio frame. The decision whether to change the direction of a subframe, and also when to change it, may be taken by a network node independently or depending upon the TDD UL/DL subframe configuration used in one or more neighboring cells also employing TDD.

In principle, any subframe which is not adjacent to 'special subframe (S)' may be configured as a 'dynamic' or 'flexible' subframe. For example, in TDD configuration 0 shown in the table of FIG. 1, any of the subframes 3, 4, 8 and 9 may be configured as a flexible subframe.

Carrier Aggregation, CA

Carrier Aggregation, CA, is one way of increasing the throughput per user for communication devices with good channel conditions and with the capability of receiving and transmitting at higher data rate. A communication device may be configured to communicate in two or three (or more) simultaneous bands in DL and/or in UL.

FIGS. 2A-2D illustrates some examples of how different Component Carriers, CCs, may be employed in a radio communication between a network node 200 and a communication device 202 where the network node 200 is capable of running e.g. 4 different cells at the same time. These cells are operated either in different bands or they could also be operated in the same band. FIG. 2A illustrates a single UL transmission from the communication device 202, as shown by a dotted arrow, and a single DL transmission from the network node 200 to the communication device 202, as shown by a striped arrow.

In FIG. 2B, a DL CA transmission across 2 DL bands/carriers from the network node 200 to the communication device 202, indicated by two striped arrows, and a single UL transmission from the communication device 202, indicated by one dotted arrow, are shown. Compared to FIG. 2A, two of the cells are thus activated for one communication device, which is the initial version of DL carrier aggregation. In this case, the communication device 202 is configured to receive in 2 DL bands/carriers simultaneously, while still using UL in only one of the bands/carriers. The UL allocation in this case is arbitrary, meaning that either of the bands/carriers may be used for UL transmission. In CA terms, the cell where UL is allocated for the communication device 202 is a primary cell, PCell, of the communication device, while the other aggregated cell is a secondary cell, SCell. It should be noted that PCell and SCell combinations are specific for each communication device.

In FIG. 2C, a DL CA transmission across 3 DL bands/carriers from the network node 200 to the communication device 202, indicated by three striped arrows, and a single UL transmission from the communication device 202, indicated by one dotted arrow, are shown. In this case, 3 DL bands/carriers are allocated to the communication device, and thus 3 DL CA is realized. Similar to the 2 DL CA case in FIG. 2B, the UL may be allocated to any of the bands/carriers.

In FIG. 2D, a DL CA transmission across 2 DL bands/carriers from the network node 200 to the communication device 202, indicated by two striped arrows, and a UL CA transmission across 2 DL bands/carriers from the communication device 202, indicated by two dotted arrows, are shown. In contrast to the two cases in FIGS. 2B and 2C, UL CA is enabled also for the communication device in FIG. 2D. In case of UL CA, PCell and SCell definitions may still be specific for each communication device.

CA Deployment Scenarios

Depending on the carrier frequency, or depending on the physical network node deployment, the deployment of CA enabled system may be different. In one example of CA deployment described in 3GPP TS 36.300 v12.2.0, F1 and F2 cells are co-located and overlaid, but the F2 cells have smaller coverage due to larger path loss. Only the F1 cells provide sufficient coverage while the F2 cells are used to improve throughput. Mobility is enabled based on F1 coverage. This is a likely scenario when F1 and F2 are of different bands, such as, e.g. F1={800 MHz, 2 GHz} and F2={3.5 GHz}, etc. It is expected that CA is possible between overlaid F1 and F2 cells.

In another example of CA deployment, F1 provides macro coverage and on F2 Remote Radio Heads (RRHs) are used to improve throughput locally at certain hot spots. Mobility is enabled based on F1 coverage. This is also a likely scenario when F1 and F2 are of different bands, e.g., F1={800 MHz, 2 GHz} and F2={3.5 GHz}, etc. It is expected that F2 RRHs cells may be aggregated with the underlying F1 macro cells.

Dual Connectivity, DC

In Dual Connectivity, DC, a communication device may be served by two network nodes. These are commonly referred to as main eNB (MeNB) and secondary eNB (SeNB), or primary and secondary eNBs, or anchor and booster eNBs. The communication device is configured with a Primary Component Carrier, PCC, from both MeNB and SeNB. The PCell from MeNB and SeNB are referred to as PCell and PSCell, respectively. The PCell and PSCell typically operate the communication device independently. The communication device is also configured with one or more Secondary CCs, SCCs, from each of MeNB and SeNB. The corresponding secondary serving cells served by MeNB and SeNB are referred to as SCell. The communication device operating in DC typically has separate transmissions/receptions, TX/RX, for each of the connections with MeNB and SeNB. This allows the MeNB and SeNB to independently configure the communication device with one or more procedures, such as, e.g. radio link monitoring (RLM), DRX cycle, etc., on their PCell and PSCell, respectively.

FIG. 3 shows an example of a Dual Connectivity, DC, deployment scenario.

More specifically, DC is a mode of operation of a communication device in RRC_CONNECTED state. Here, the communication device is configured with a Master Cell Group, MCG, and a Secondary Cell Group, SCG. Cell Group, CG, is a group of serving cells associated with either the MeNB or the SeNB. The MCG and SCG are defined as follows:

Main Cell Group, MCG, is a group of serving cells associated with the MeNB, comprising of the PCell and optionally one or more SCells.

Secondary Cell Group, SCG, is a group of serving cells associated with the SeNB comprising of PSCell, Primary SCell, and optionally one or more SCells.

Two kinds of operation modes may be considered. First, a synchronized operation wherein the DL timing for MeNB and SeNB is synchronized down to about half an OFDM symbol (about ±33 μs), and secondly, an unsynchronized operation wherein the downlink timing for MeNB and SeNB is synchronized down to half a subframe (±500 μs).

However, sometimes the choice of UL/DL subframe configurations may not be optimal for different communication devices, which may result in poor utilization of available radio resources, e.g. caused by interference generated in the communication with those communication devices and/or by a large signaling overhead.

SUMMARY

It is an object of embodiments described herein to address at least some of the problems and issues outlined above. It is possible to achieve this object and others by using a network node, a communication device and methods therein as defined in the attached independent claims.

According to one aspect, a method is performed by a network node for handling dynamic uplink/downlink, UL/DL, subframe configurations in communication with a communication device operating in TDD. In this method, the network node obtains capability information indicating whether the communication device supports at least one of carrier aggregation and frequency band combination. The capability information further indicates whether the communication device supports simultaneous reception and transmission of signals on different carriers or frequency bands.

The network node further determines, based on the capability information obtained in action 600, UL/DL subframe configurations for the communication device such that the communication device is to use different UL/DL subframe configurations for different carriers or frequency bands when at least one of the following conditions is fulfilled:

the different carriers or frequency bands are non-adjacent and separated in frequency above a predefined threshold level;

the different carriers or frequency bands form a band/carrier combination for which Radio Frequency, RF, requirements are not allowed for simultaneously receiving and transmitting signals; and the different carriers or frequency bands form a band/carrier combination for which the obtained capability information indicates that the communication device is not capable of simultaneous reception and transmission of signals on the different carriers or frequency bands.

The network node then transmits configuration information to the communication device indicating the determined UL/DL subframe configurations.

According to another aspect, a network node is arranged to handle dynamic UL/DL subframe configurations in communication with a communication device operating in TDD. The network node comprises a processor and a memory, said memory comprising instructions executable by said processor whereby the network node is operative to:

obtain capability information indicating whether the communication device supports at least one of carrier aggregation and frequency band combination, and the capability information further indicating whether the communication device supports simultaneous reception and transmission of signals on different carriers or frequency bands, and determine, based on the obtained capability information, UL/DL subframe configurations for the communication device such that the communication device is to use different UL/DL subframe configurations for different carriers or frequency bands, when at least one of the following conditions is fulfilled:

the different carriers or frequency bands are non-adjacent and separated in frequency above a predefined threshold level;

the different carriers or frequency bands form a band/carrier combination for which Radio Frequency, RF, requirements are not allowed for simultaneously receiving and transmitting signals; and the different carriers or frequency bands form a band/carrier combination for which the obtained capability information indicates that the communication device is not capable of simultaneous reception and transmission of signals on the different carriers or frequency bands.

The network node is further operative to transmit configuration information to the communication device indicating the determined UL/DL subframe configurations.

According to another aspect, a method is performed by a communication device for handling dynamic UL/DL subframe configurations when operating in TDD in communication with a network node. In this method, the communication device receives configuration information from the network node indicating UL/DL subframe configurations for use by the communication device on a serving cell when operating in carrier aggregation and/or frequency band combination of different frequency bands or carriers. The communication device further determines for which of the different frequency bands or carriers the received UL/DL subframe configurations are to be used, based on which cell(s) of the communication device that the communication device associates with the received UL/DL subframe configurations, and/or based on an indicator received from the network node indicating for which cell(s) of the communication device that the received UL/DL subframe configurations are to be used. The communication device also applies the received UL/DL subframe configurations on said determined frequency bands or carriers.

According to another aspect, a communication device is arranged to arranged to handle dynamic UL/DL subframe configurations when operating in TDD in communication with a network node. The communication device comprises a processor and a memory, said memory comprising instructions executable by said processor whereby the communication device is operative to:

receive configuration information from the network node indicating UL/DL subframe configurations for use by the communication device on a serving cell when operating in carrier aggregation and/or frequency band combination of different frequency bands or carriers, determine for which of the different frequency bands or carriers the received UL/DL subframe configurations are to be used, based on which cell(s) of the communication device that the communication device associates with the received UL/DL subframe configurations, and/or based on an indicator received from the network node indicating for which cell(s) of the communication device that the received UL/DL subframe configurations are to be used, and apply the received UL/DL subframe configurations on said determined frequency bands or carriers.

According to yet another aspect, a method is performed by a communication device for handling dynamic UL/DL subframe configurations when operating in TDD in communication with a network node. In this method the communication device obtains capability information indicating whether the communication device supports at least one of carrier aggregation and frequency band combination, and the capability information further indicating whether the communication device supports simultaneous reception and transmission of signals on different carriers or frequency bands.

The communication device then determines, based on the obtained capability information, UL/DL subframe configurations such that the communication device is to use different UL/DL subframe configurations for the different carriers or frequency bands when at least one of the following conditions is fulfilled:

the different carriers or frequency bands are non-adjacent and separated in frequency above a predefined threshold level;

the different carriers or frequency bands form a band/carrier combination for which Radio Frequency, RF, requirements are not allowed for simultaneously receiving and transmitting signals; and the different carriers or frequency bands form a band/carrier combination for which the obtained capability information indicates that the communication device is not capable of simultaneous reception and transmission of signals on the different carriers or frequency bands.

The communication device also transmits configuration information to the network node indicating the determined UL/DL subframe configurations.

The above network node, communication device and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 1 is a table illustrating some examples of UL/DL subframe configurations, according to the prior art.

FIGS. 2A-2D illustrate some communication scenarios involving a network node and a communication device, which may be employed in some possible embodiments.

FIG. 6 is a flow chart illustrating a procedure in a network node, according to further possible embodiments.

FIG. 7 is a flow chart illustrating a procedure in a communication device, according to further possible embodiments.

DETAILED DESCRIPTION

Various embodiments and features will now be described which may be used to address the problems mentioned above.

For example, in LTE, each network node, eNB, sends cell configuration information of each cell in the network node to neighboring network nodes using X2 signalling. This information may also comprise TDD related information, such as, e.g. UL/DL subframe configuration, special subframe configuration, etc. Therefore, in principle, the "dynamic" TDD could be used already according to Release 8 of the 3GPP EUTRA specification. However, in practice, hitherto "dynamic" TDD has not been realized. This is mainly due to lack of efficient interference mitigation techniques in order to alleviate interference caused by the use of dynamic TDD.

Furthermore, in the existing solutions, dynamic TDD, or eIMTA, is mainly defined for single carrier LTE, thus these solutions mainly concentrate on a single carrier LTE system. For carrier aggregation systems, there may be issues related to which TDD UL/DL subframe configuration to use for the two or more LTE carriers.

In particular, the radio requirements of the communication device, RRM requirements and performance requirements are only defined and applicable for a communication device operating with dynamic TDD/eIMTA on the primary serving cell, PCell.

For example, operating eIMTA in multiple component carriers, CCs, may have co-existence issues due to interference between UL and DL transmissions in different carriers. So it is not clear what level of flexibility in TDD UL/DL subframe configurations may be used in a CA or DC mode. Also, it is not clear how close the frequency bands/carriers can be allowed to be if one or both of the frequency bands/carriers are in eIMTA mode. At least some of the above issues may be addressed by the embodiments presented herein.

Figure 3:
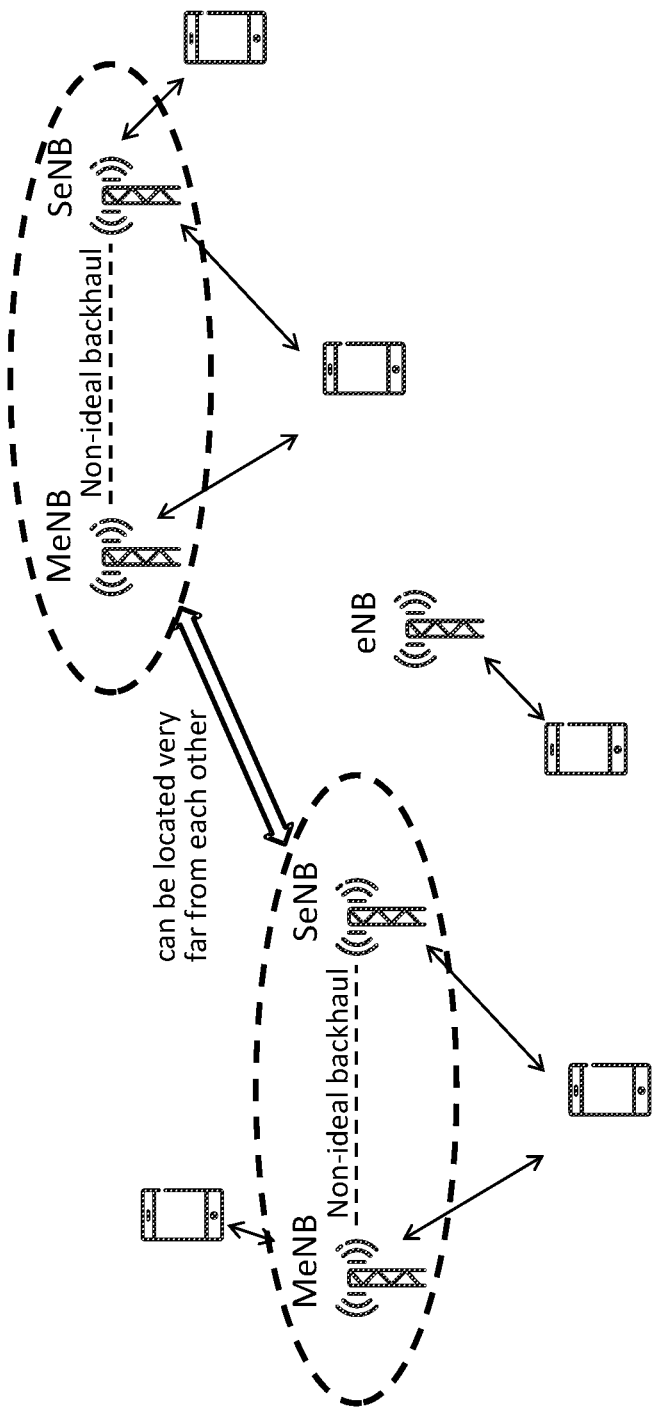
FIG. 3 illustrates a communication scenario where dual connectivity is deployed, which may be employed in some possible embodiments.
Figure 4:
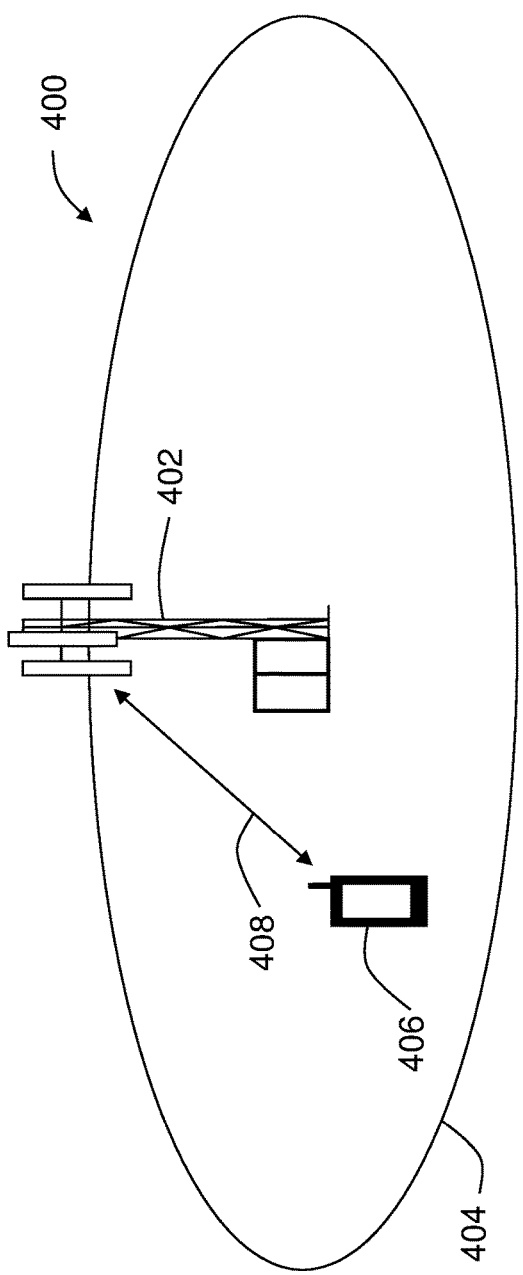
FIG. 4 illustrates a radio communications network in which embodiments herein may be implemented.

FIG. 4 illustrates schematically a radio communications network 400 in which the embodiments herein may be implemented. In the examples described herein, the radio communications network 400 may be a Long Term Evolution (LTE) network. Although, the radio communication network 400 is exemplified herein as an LTE network, the radio communications network 400 may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system.

The radio communications system 400 comprises a network node 402. The network node 402 serves at least one cell 404. The network node 402 may correspond to any type of radio network node or any network node, which communicates with a communication device and/or with another network node, such as, e.g. a base station, a radio base station, eNB, eNodeB, a Home Node B, a Home eNode B, femto Base Station (BS), pico BS, etc. Further non-limiting examples of the network node 402 include a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 404 uniquely in the whole radio communication network 100 is also broadcasted in the cell 404. The network node 402 communicates over the air or radio interface operating on radio frequencies with the communication device s within range of the network node 402.

In FIG. 4, a communication device 406 is located within the cell 404. The communication device 406 is configured to communicate within the radio communications network 400 via the network node 402 over a radio link 408 when present in the cell 404 served by the network node 402. The communication device 406 may refer to any type of wireless device communicating with a network node and/or with another communication device in a cellular, mobile or radio communication network or system. Examples of such communication devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

Furthermore, a Component Carrier, CC, also interchangeably referred to herein as a frequency band, carrier, PCC or SCC, is configured at the communication device 406 by the network node 402 using higher layer signalling, e.g. by sending RRC configuration messages to the communication device 406. The configured CC may be used by the network node 402 for serving the communication device 406 406 on the serving cell, e.g. on PCell, PSCell, SCell, etc., of the configured CC. The configured CC may also be used by the communication device 406 406 for performing one or more radio measurements, e.g. RSRP, RSRQ, etc., on the cells operating on the CC, e.g. PCell, SCells, PSCells and neighboring cells.

In some embodiments, the term determining may also interchangeably herein refer to obtaining, receiving, detecting, identifying, etc., when used for a specific information or parameter, etc.

It should also be noted that the terms eIMTA and dynamic TDD are interchangeably used herein, but basically refer to the same TDD feature. This TDD feature may also be referred to as dynamic UL/DL subframe configuration or dynamic UL/DL subframe operation.

In this solution, the network node 402 obtains capability information indicating whether the communication device 406 supports carrier aggregation and/or frequency band combination, and also indicating whether the communication device supports simultaneous reception and transmission of signals on different carriers or frequency bands. For example, capabilities can be sent from the communication device 406 to the network node 402, e.g. during network attachment or after handover, or they can be acquired from another network node, not shown, e.g. from the source node in case of handover or from a more central node in the a network such as a Mobility Management Entity, MME, node. The network node 402 then determines UL/DL subframe configurations for the communication device 406 based on the obtained capability information such that the communication device is to use different UL/DL subframe configurations for different carriers or frequency bands, when certain conditions are fulfilled, to be described below.

UE Capability

Figure 5:
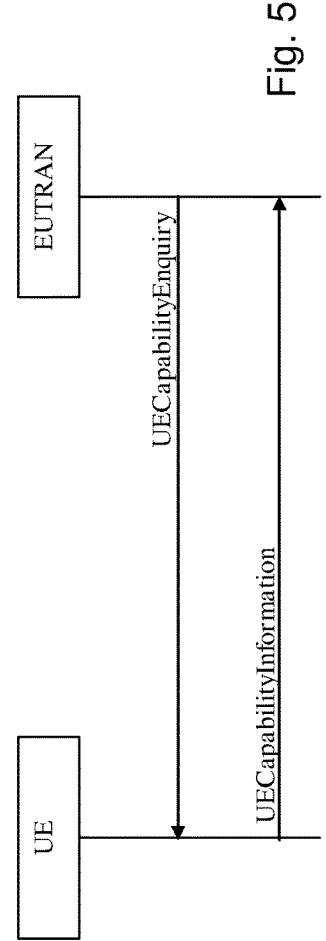
FIG. 5 is a signaling diagram illustrating how capability of a UE can be transferred to an EUTRAN network, according to further possible embodiments.

The purpose of UE capability procedure is generally to transfer the radio access capability information of the communication device from the communication device to a radio communication network, such as E-UTRAN. The radio communication network may initiate the procedure to a communication device in RRC_CONNECTED when it needs radio access capability information of the communication device. Therefore, the communication device typically signals its capability information to the network node, e.g. eNB, via RRC signaling in response to the reception of a UECapabilityEnquiry message. The communication device may also signal its capability information to the core network node, such as, e.g. a MME, via Non Access Stratum, NAS, signalling during initial setup or in idle mode. FIG. 5 shows an example of how the capability of a UE can be transferred to the radio communication network, in this case E-UTRAN, where the UE sends its capabilities in a message denoted "UECapabilityInformation", in response to a capability request sent from the network in a message denoted "UECapabityEnquiry".

Communication devices are capable of supporting certain number of bands/carriers (CCs) based on the RF architecture of the communication device. The maximum number of bands/carriers (CCs) that a communication device may support is five (5). While performing connection setup, the communication device may report its capability to the radio communications network.

Since DC operation with dual TX/RX at the communication device is quite similar to 2 UL CA, the UL CA capabilities are briefly explained below.

Upon connecting to any network node, the communication device transmits following UE capabilities among others:

2UL inter-band CA capabilities per band
  2UL intra-band CA capabilities for contiguous CC aggregation per band, and
  2UL intra-band CA capabilities for non-contiguous CC aggregation per band.

Once the above UE capabilities are received by the network node, then the network node may decide on whether the communication device should be able to do UL CA in certain band combinations or not.

Furthermore, according to 3GPP TS 36.331, v 12.2.0, for inter-band TDD CA, there is an information element, IE, simultaneousRx-Tx in the IE UE-EUTRA-Capability described as following:

simultaneousRx-Tx

This IE indicates whether the UE supports simultaneous reception and transmission on different bands for each band combination listed in supportedBandCombination. This field is only applicable for inter-band TDD carrier aggregation.

According to this UE capability, there will be two kinds of communication devices for inter-band TDD carrier aggregation, that is, the communication device supporting simultaneous reception and transmission on different bands, and the communication device not supporting simultaneous reception and transmission on different bands.

An example of how the solution may be employed in terms of actions in a procedure performed by a network node for handling dynamic uplink/downlink, UL/DL, subframe configurations in communication with a communication device operating in TDD, will now be described with reference to the flow chart in FIG. 6. This procedure can thus be used to accomplish the functionality described herein, and some possible but non-limiting embodiments will also be described below. The network node in this example corresponds to the network node 402 in FIG. 4.

A first action 600 illustrates that the network node obtains capability information indicating whether the communication device supports at least one of carrier aggregation and frequency band combination. The capability information further indicates whether the communication device supports simultaneous reception and transmission of signals on different carriers or frequency bands. For example, the capability information may be obtained in this action when sent from the communication device in response to a capability request received from the network node, e.g. during network attachment or after handover, basically as illustrated by FIG. 5. As mentioned above, the capability information may also be acquired from another network node such as the source node in case of handover or a node in the core network such as the MME node. This solution is however not limited to any particular way of obtaining the capability information.

In a next action 602, the network node determines, based on the capability information obtained in action 600, UL/DL subframe configurations for the communication device such that the communication device is to use different UL/DL subframe configurations for different carriers or frequency bands when at least one of the following conditions is fulfilled:

the different carriers or frequency bands are non-adjacent and separated in frequency above a predefined threshold level;

the different carriers or frequency bands form a band/carrier combination for which Radio Frequency, RF, requirements are not allowed for simultaneously receiving and transmitting signals; and the different carriers or frequency bands form a band/carrier combination for which the obtained capability information indicates that the communication device is not capable of simultaneous reception and transmission of signals on the different carriers or frequency bands.

The above conditions will be described in more detail later below. A further action 604 illustrates that the network node transmits configuration information to the communication device indicating the determined UL/DL subframe configurations. Thereby, the communication device is effectively instructed, and also enabled, to use the determined UL/DL subframe configurations accordingly in the communication with the network node. It is an advantage that this procedure enables a flexible use of dynamic TDD in a range of different operating scenarios and conditions e.g. in terms of bandwidth, RF requirements, CC deployment and DC deployment.

In the procedure of FIG. 6, various embodiments are possible to employ as follows. In one possible embodiment, the obtained capability information may indicate that the communication device is capable of at least one of carrier aggregation and frequency band combination for the different carriers or frequency bands, and that the communication device is capable of simultaneous reception and transmission of signals on different carriers or frequency bands.

In another possible embodiment, the network node may determine that the communication device is to use a first UL/DL subframe configuration for a first set of the different carriers or frequency bands, and use a second UL/DL subframe configuration for a second set of the different carriers or frequency bands, wherein the second UL/DL subframe configuration is statically assigned in the communication device, when the obtained capability information indicates that the communication device is capable of at least one of carrier aggregation and frequency band combination for the different carriers or frequency bands and that the communication device is not capable of simultaneous reception and transmission of signals on the different carriers or frequency bands.

In another possible embodiment, the above-mentioned first UL/DL subframe configuration may be a dynamic UL/DL subframe configuration and the above-mentioned second UL/DL subframe configuration may be a static UL/DL subframe configuration.

In another possible embodiment, the network node may determine for which cell(s) of the communication device that the determined UL/DL subframe configurations are to be used by the communication device, and the network node may further transmit an indicator indicating said cell(s) to the communication device.

In further possible embodiments, the network node may determine for which cell(s) of the communication device that the determined UL/DL subframe configurations are to be used by the communication device, based on at least one of:

a determined cell priority;
a determined frequency range;
UL and/or DL transmissions;
the transmission bandwidth;
a quality of the radio link of any one of the different carriers or frequency bands;
a radio frequency co-existence requirement of the different carriers or frequency bands; and
a Maximum Power Reduction, MPR, requirement of the different carriers or frequency bands.

In another possible embodiment, the UL/DL subframe configurations may be determined for combined frequency bands used in a Dual Connectivity, DC, operation. In another possible embodiment, the UL/DL subframe configurations may be determined for aggregated carriers used in a Carrier Aggregation, CA, operation.

An example of how the solution may be employed in terms of actions in a procedure performed by a communication device for handling dynamic UL/DL subframe configurations when operating in TDD in communication with a network node, will now be described with reference to the flow chart in FIG. 7. This procedure can thus also be used to accomplish the functionality described herein, and some possible but non-limiting embodiments of this procedure will further be described below. The communication device in this example corresponds to the communication device 406 in FIG. 4.

A first action 700 illustrates that the communication device receives configuration information from the network node indicating UL/DL subframe configurations for use by the communication device on a serving cell when operating in carrier aggregation and/or frequency band combination of different frequency bands or carriers, which basically follows action 604 above as indicated by a dashed arrow.

In a next action 702, the communication device determines for which of the different frequency bands or carriers the received UL/DL subframe configurations are to be used, based on which cell(s) of the communication device that the communication device associates with the received UL/DL subframe configurations, and/or based on an indicator received from the network node indicating for which cell(s) of the communication device that the received UL/DL subframe configurations are to be used. A final action 704 then illustrates that the communication device applies the received UL/DL subframe configurations on said determined frequency bands or carriers.

In the procedure of FIG. 7, various embodiments are possible here as well to employ as follows. In one possible embodiment, said cell(s) of the communication device may be a primary cell or at least one secondary cell.

In another possible embodiment, when the UL/DL subframe configurations are associated with a primary cell, the communication device may determine that the received UL/DL subframe configurations are to be used for the different frequency bands or carriers in the primary cell only.

In another possible embodiment, when the UL/DL subframe configurations are associated with a secondary cell, the communication device may determine that the received UL/DL subframe configurations are to be used for the different frequency bands or carriers in both the primary cell and the one or more secondary cells.

In another possible embodiment, when the UL/DL subframe configurations are associated with more than one cell comprising a primary cell, the communication device determines that the received UL/DL subframe configurations are to be used for the different frequency bands or carriers for all cells of the communication device.

In another possible embodiment, the above-mentioned indicator received from the network node may indicate that the received UL/DL subframe configurations are to be applied only for the cell which the UL/DL subframe configurations are associated with, or that the received UL/DL subframe configurations are to be applied to all cells of the communication device.

In another possible embodiment, the communication device may determine that one existing UL/DL subframe configuration for one or more cells of the communication device is to be used for one or more additional cells of the communication device based on at least one of:
  a determined cell priority;
  a determined frequency range;
  UL and/or DL transmissions;
  the transmission bandwidth;
  a quality of the radio link of any one of the different carriers or frequency bands;
  a radio frequency co-existence requirement of the different carriers or frequency bands; and
  a Maximum Power Reduction, MPR, requirement of the different carriers or frequency bands.

The above procedure in FIG. 6 was described in terms of actions performed by a network node. However, this procedure and actions 600-604 may alternatively be basically performed by the communication device itself with some slight modifications, as follows.

Thus, the procedure may be performed by a communication device for handling dynamic UL/DL subframe configurations when operating in TDD in communication with a network node. In this case, the communication device obtains capability information indicating whether the communication device supports at least one of carrier aggregation and frequency band combination, and the capability information further indicating whether the communication device supports simultaneous reception and transmission of signals on different carriers or frequency bands, which corresponds to action 600. In this case, the communication device may obtain the capability information from a memory or the like in the device.

The communication device then determines, based on the obtained capability information, UL/DL subframe configurations such that the communication device is to use different UL/DL subframe configurations for the different carriers or frequency bands when at least one of the following conditions is fulfilled:
  the different carriers or frequency bands are non-adjacent and separated in frequency above a predefined threshold level;
  the different carriers or frequency bands form a band/carrier combination for which Radio Frequency, RF, requirements are not allowed for simultaneously receiving and transmitting signals; and
  the different carriers or frequency bands form a band/carrier combination for which the obtained capability information indicates that the communication device is not capable of simultaneous reception and transmission of signals on the different carriers or frequency bands, which corresponds to action 602.

The communication device then finally transmits configuration information to the network node indicating the determined UL/DL subframe configurations, which basically corresponds to action 604.

A non-limiting example of how a network node and a communication device may be structured to bring about the above-described solution and embodiments thereof, will now be described with reference to the block diagram in FIG. 8. In this figure, the network node 800 and the communication device 802 may be configured to operate according to any of the examples and embodiments of employing the solution as described above, where appropriate, and as follows. Each of the network node 800 and the communication device 802 is shown to comprise a processor "P", a memory "M" and a communication circuit "C" with suitable equipment for transmitting and receiving radio signals in the manner described herein.

The communication circuit C in each of the network node 800 and the communication device 802 thus comprises equipment configured for communication over a radio interface using a suitable protocol for radio communication depending on the implementation. The solution is however not limited to any specific types of messages or protocols. An example of such a communication was described above for FIGS. 6 and 7.

The actions of FIGS. 6 and 7 may be performed by means of functional modules in the respective processors P in the network node 800 and the communication device 802. For example, the network node 800 comprises means configured or arranged to perform the actions of the flow chart in FIG. 6 in the manner described above. Further, the communication device 802 comprises means configured or arranged to perform the actions of at least the flow chart in FIG. 7 in the manner described above. The communication device 802 may also comprise means configured to basically perform the actions of the flow chart in FIG. 6 as well with some slight modifications that were described above.

The network node 800 is arranged to handle dynamic UL/DL subframe configurations in communication with the communication device 802 operating in TDD. The network node 800 thus comprises the processor P and the memory M, said memory comprising instructions executable by said processor, whereby the network node 800 is operative as follows.

The network node 800 is operative to obtain capability information indicating whether the communication device supports at least one of carrier aggregation and frequency band combination, and the capability information further indicating whether the communication device supports simultaneous reception and transmission of signals on different carriers or frequency bands. This operation may be performed by an obtaining module 800A in the network node 800, e.g. in the manner described for action 600 above.

The network node 800 is also operative to determine, based on the obtained capability information, UL/DL subframe configurations for the communication device such that the communication device is to use different UL/DL subframe configurations for different carriers or frequency bands, when at least one of the following conditions is fulfilled:
  the different carriers or frequency bands are non-adjacent and separated in frequency above a predefined threshold level;
  the different carriers or frequency bands form a band/carrier combination for which Radio Frequency, RF, requirements are not allowed for simultaneously receiving and transmitting signals; and the different carriers or frequency bands form a band/carrier combination for which the obtained capability information indicates that the communication device is not capable of simultaneous reception and transmission of signals on the different carriers or frequency bands. This operation may be performed by a determining module 800B in the network node 800, e.g. in the manner described for action 602 above.

The network node 800 is further operative to transmit configuration information to the communication device indicating the determined UL/DL subframe configurations. This operation may be performed by a transmitting module 800C in the network node 800, e.g. in the manner described for action 604 above.

The communication device 802 is arranged to handle dynamic UL/DL subframe configurations when operating in TDD in communication with the network node 800. The communication device 802 comprises a processor P and a memory M, said memory comprising instructions executable by said processor whereby the communication device 802 is operative as follows.

The communication device 802 is operative to receive configuration information from the network node indicating UL/DL subframe configurations for use by the communication device on a serving cell when operating in carrier aggregation and/or frequency band combination of different frequency bands or carriers. This receiving operation may be performed by a receiving module 802A in the communication device 802, e.g. in the manner described for action 700 above.

The communication device 802 is also operative to determine for which of the different frequency bands or carriers the received UL/DL subframe configurations are to be used, based on which cell(s) of the communication device that the communication device associates with the received UL/DL subframe configurations, and/or based on an indicator received from the network node indicating for which cell(s) of the communication device that the received UL/DL subframe configurations are to be used. This operation may be performed by a determining module 802B in the communication device 802, e.g. in the manner described for action 702 above.

The communication device 802 is also operative to apply the received UL/DL subframe configurations on said determined frequency bands or carriers. This operation may be performed by an applying module 802C in the communication device 802, e.g. in the manner described for action 704 above.

Figure 8:
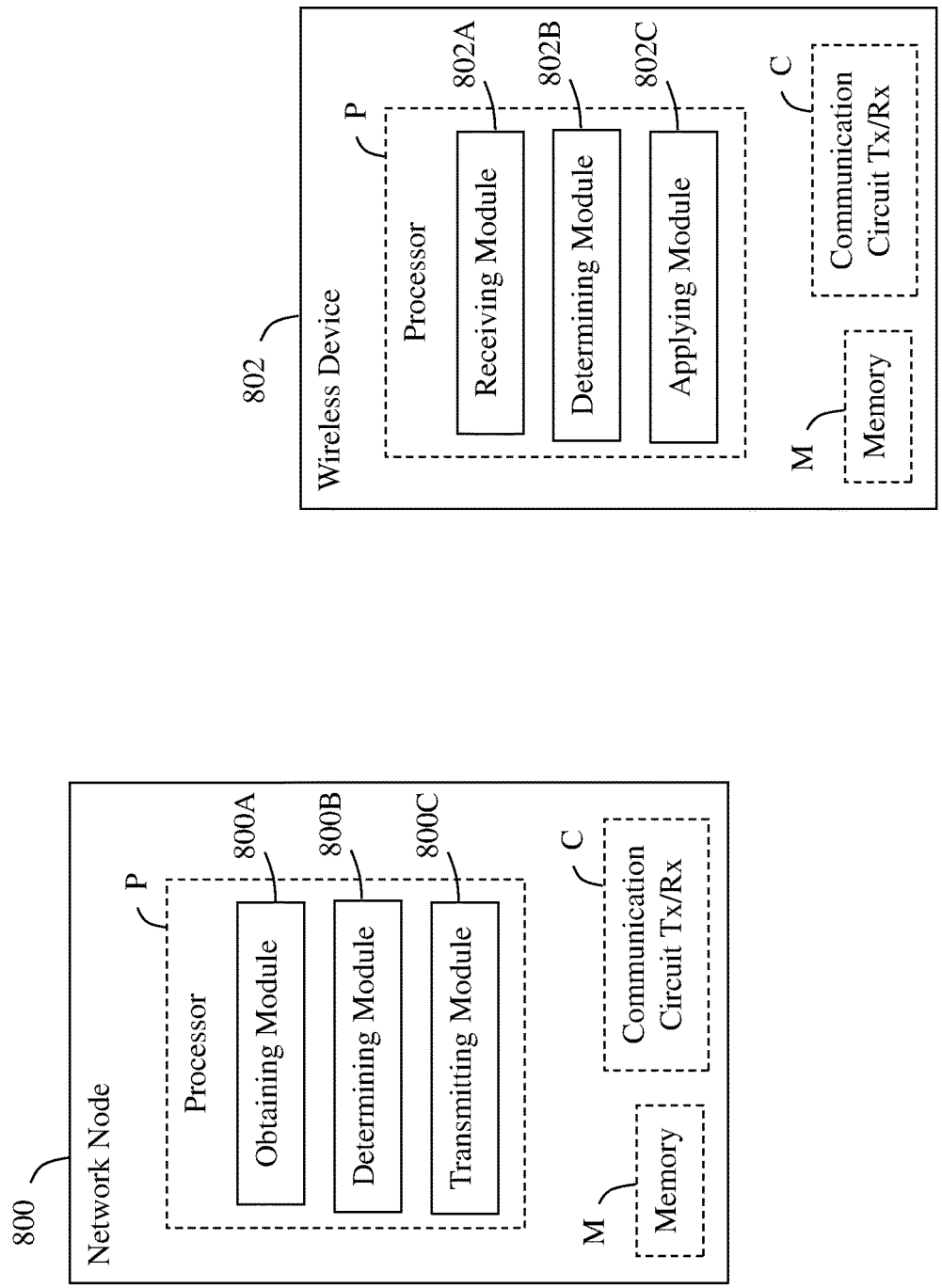
FIG. 8 is a block diagram illustrating a network node and a communication device in more detail, according to further possible embodiments.

It should be noted that FIG. 8 illustrates various functional modules in the network node 800 and the communication device 802, respectively, and the skilled person is able to implement these functional modules in practice using suitable software and hardware. Thus, the solution is generally not limited to the shown structures of the network node 800 and the communication device 802, and the functional modules 800A-C and 802A-C therein may be configured to operate according to any of the features and embodiments described in this disclosure, where appropriate.

The functional modules 800A-C and 802A-C described above may be implemented in the network node 800 and the communication device 802, respectively, by means of program modules of a respective computer program comprising code means which, when run by the processor P causes the network node 800 and the communication device 802 to perform the actions and procedures described herein. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 800 and the communication device 802 in the form of a memory having a computer readable medium and being connected to the processor P. The computer program product or memory M in each of the network node 800 and the communication device 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 800 and communication device 802.

The solution described herein may be implemented in each of the network node 800 and the communication device 802 by a computer program comprising instructions which, when executed on at least one processor, cause the at least one processor to carry out the actions according to any of the above embodiments, where appropriate. The solution may also be implemented at each of the network node 800 and the communication device 802 in a carrier containing the above computer program, wherein the carrier is one of an electronic signal, optical signal, radio signal, or computer readable storage medium.

Various illustrative but non-limiting examples of how the above embodiments and procedures can be implemented and used in practice, will now be described in more detail. Reference will also be made to the entities in FIG. 4 which are used to represent the network node and communication device discussed herein.

For example, several of the embodiments herein are described in the context of using two CCs, although the procedures and embodiments herein may be extended for more than two CCs that are aggregated for any communication device. Similarly, for dual connectivity context, only two nodes (or cells) are mentioned to be serving an communication device in a dual connectivity operation, although the procedures and embodiments equally apply to DC operation with more than two nodes or serving cells, unless otherwise mentioned. Thus, in the following examples, one MeNB and one SeNB are involved for simplicity; however, the examples may also be valid for one MeNB and more than one SeNBs, unless otherwise mentioned.

In the following, the described features and procedures are applicable to both carrier aggregation (CA) and dual connectivity (DC), unless otherwise mentioned.

Various methods are possible to use at the network node 402 and at the communication device 406, respectively, when handling dynamic UL/DL subframe configurations as follows 406.

Determination of eIMTA Configuration by the Network Node 402 Based on Communication Devices 406 Capability Signaling In some embodiments, the network node 402 may decide on applicable eIMTA configurations, i.e. dynamic UL/DL subframe configurations, across aggregated carriers based on combination of communication device 406 capabilities in terms of at least CA and signal reception and transmission.

As an example embodiment, the communication device 406 signals its capabilities for the following items:

- Its capabilities in terms CA or DC configuration (CA_xA_yA and DC_xA_yA are denoted as examples for carrier aggregation and dual connectivity, respectively), i.e. the bands or pair of bands where it may support different kinds of carrier aggregation or dual connectivity inter-band operations
- The communication device 406 also reports its capability on simultaneous or non-simultaneous TxRx capabilities (we denote as simultaneousRx-Tx). In simultaneousRx-Tx operation the communication device 406 is able to receive and transmit on different carriers at the same time e.g. in subframe #3 the communication device 406 receives on carrier f1 while in subframe #3 the communication device 406 transmits on carrier f2. The simultaneous or non-simultaneous TxRx capabilities are typically associated with CA configuration or CA band combination. For example the same communication device 406 may support simultaneousRx-Tx operation for CA in band A and band B, while it may support non-simultaneous Rx-Tx operation for CA in band A and band C.

Example of CA Configurations

The network node 402 obtaining the two capabilities may combine the two capabilities for inter-band cases in carrier aggregation: (1) CA_xA-yA and (2) simultaneousRx-Tx, and decide whether to assign different eIMTA configuration for band x and band y or assign same eIMTA configuration based on the following rules as examples:

- If the communication device 406 is capable of CA_xA-yA CA configuration and also the communication device 406 is capable of simultaneousRx-Tx, then the different eIMTA may be assigned for band x and band y.
- If the communication device 406 is capable of CA_xA-yA CA configuration but not capable to perform simultaneousRx-Tx, then eIMTA configuration may be assigned for only one of the band x and band y, while the other band may be assigned static TDD configuration.

Any of the above rules may also be pre-defined explicitly and/or implicitly via communication device 406 performance requirements. For example the communication device 406 signaling the two set of capabilities (CA_xA-yA CA configuration and simultaneousRx-Tx) may need to meet requirements corresponding CA configuration with different eIMTA.

Example of Dual Connectivity Configurations

The above procedure is also applicable for dual connectivity systems, only with the exception that the communication device 406 capability signaling will include dual configuration signaling instead of CA configuration signaling. As an example embodiment, the following rule will be applied as examples:

- If the communication device 406 is capable of DC_uA-wA DC configuration & also the communication device 406 may perform simultaneousRx-Tx, then the different eIMTA may be assigned for band u and band w.
- If the communication device 406 is capable of DC_uA-wA DC configuration but not capable to perform simultaneousRx-Tx, then eIMTA configuration need to be assigned for band u or band w, while the other band may be assigned static TDD configuration.

Any of the above rules may also be pre-defined explicitly and/or implicitly via communication device 406 performance requirements.

In some embodiments, DC_uA-wA DC may not necessarily be explicitly signaled by the communication device 406 to the network node 402. Instead, it may be derived by the network node 402. For example, the network node 402 may determine DC_uA-wA DC from combining other communication device 406 capabilities, such a CA configuration with more than one UL or DL configurations may be combined with per communication device 406 dual connectivity capability.

Determination of eIMTA Configuration by the Network Node 402 Based on Proximity of Bands As indicated above, the network node 402 may assign different eIMTA configurations for different CCs to the communication device 406 in CA operation provided that at least any two of the following conditions are true:

- The CCs are in bands which are relatively far from each other in frequency. The minimum band separation or frequency separation between CCs may be based on a predetermined rule or configured by the network node 402. For example CC1 and CC2 belonging to frequency band 8 (900 MHz range) and band 7 (2600 MHz range) are considered to be far apart in frequency.
- The CCs are in band combinations where RF requirements are allowed for simultaneous TxRx,
- The CCs are in band combinations where communication device 406 capability does indicate simultaneous TxRx, unless otherwise mentioned.

Determination of eIMTA Configuration by the Network Node 402 for Inter- and Intra-Band Combinations In case, the communication device is capable of supporting a mixture of inter- and intra-band aggregation, then the following may apply.

For example, if there are xA_yC capabilities for a combination of two bands, Band x and band y, where yC capability includes intra-band aggregation capability, it can be assumed that inter-band and intra-band combinations are present.

For the inter-band combination in the above mentioned mixed intra- and intra-band aggregation, the rules as specified herein for inter-band aggregation may apply. Similarly, for intra-band part of the mixed combination, any rules related to intra-band aggregation as mentioned herein may also apply.

Methods in a Communication Device 406 to Determine eIMTA Configurations

In the following, a few procedures are described which are performed at the communication device 406 to determine the applicable eIMTA configurations across the aggregated carriers.

Determination of eIMTA Configuration Based on a Pre-defined Rule

In some embodiments, the following predefined rules may be defined:

1. If the communication device 406 is configured with TDD CA or TDD-FDD CA (with 2 or more TDD CCs with TDD PCell) and receives eIMTA configuration for one of the TDD serving cells from the network node 402, then communication device 406 may assume that the received eIMTA configuration only applies to PCell and other TDD serving cells don't use eIMTA, e.g. in a special case as below:
    If communication device 406 is configured with TDD CA or TDD-FDD CA (with 2 or more TDD CCs with TDD PCell) and receives eIMTA configuration ONLY for PCell, then the communication device 406 may assume that the received eIMTA configuration only applies to PCell.

2. If the communication device 406 is configured with TDD CA or TDD-FDD CA (with 2 or more TDD CCs with TDD PCell) and receives eIMTA configuration for one of the TDD serving cells, then the communication device 406 may assume that other TDD serving cells use the same received eIMTA configuration.
3. If the communication device 406 is configured with TDD CA or TDD-FDD CA (with 2 or more TDD CCs with TDD PCell) and receives eIMTA configuration for (N-1) TDD serving cells including PCell, then the communication device 406 may assume that other remaining TDD serving cells use the same eIMTA configuration received for TDD PCell.

Determination of eIMTA Configuration at the Communication Device 406 Based on Reduced Signaling Overhead In some embodiments, the communication device 406 may receive eIMTA configuration for one of the TDD serving cells and may also receive an indicator (e.g. a 1 bit indicator) from the network node 402, said indicator stating whether or NOT the same eIMTA configuration applies to remaining TDD serving cells. For example, the indicator=NO may mean that the received eIMTA configuration applies only to serving cell for which configuration is sent and other cells use static TDD configuration, whereas the indicator=YES may mean that the received eIMTA configuration applies to all the serving cells supported by the communication device 406 in CA operation. If the indicator=NO, then the network node 402 may further send additional eIMTA configurations for the other serving cells. But if no additional eIMTA configurations for the other serving cells are sent by the network node 402 then the communication device 406 may assume operation using static TDD configuration on the other serving cells.

In one exemplary implementation, this indicator may apply regardless of whether the serving cells are in the same or different bands, i.e. for any CA configuration or band combination supported by the communication device 406. In another exemplary implementation, a separate indicator may be sent by the network node 402 for each CA or band combination supported by the communication device 406.

Procedures in a Node for Deriving the Baseline eIMTA Configuration for Inter-Band Cases In this section, the resulting eIMTA configuration that should be applied across all carriers or across subset of the carriers is denoted as "baseline eIMTA configuration", which may also be referred to as "reference eIMTA configuration".

The procedures in this section may be implemented in a "node", which may be either a network node 402 or a communication device 406. In case of the node being a network node 402, the network node 402 may determine the baseline eIMTA configuration and signal it to the communication device or to some other network node, e.g. an MeNB may signal the baseline eIMTA configuration to an SeNB. The communication device 406 may apply the baseline eIMTA configuration on other serving cells when operating in CA based on a pre-defined rule or indication from network node 402 referring to which eIMTA configuration is the baseline eIMTA configuration. In case of the node being a communication device 406, the communication device 406 may determine and recommend the baseline eIMTA configuration and signal the recommended eIMTA configuration to network node 402, e.g. an eNB, MeNB, or SeNB.

One or more of the following criteria may be used by the node to determine the baseline eIMTA configuration for multiple carriers, if it is decided that same eIMTA configuration will be used among subset of the carriers configured for CA for a communication device 406.

Priority to any Specific Cell

The eIMTA configuration of one particular serving cell may be used as baseline for other serving cells or for certain serving cells. As an example, in a carrier aggregation based system, the eIMTA configuration of the PCell may be followed by SCell(s) in all cases. Similarly, the eIMTA configuration of the PCell may also be used for PSCell and other Scell(s) in dual connectivity systems. For example the communication device 406 may be configured with the eIMTA configuration for the PCell. The communication device 406 may use this also for PSCell and/or for SCell(s). However if the communication device 406 is not configured with eIMTA for PCell but for PSCell, then communication device 406 uses eIMTA only on PSCell as eIMTA configuration for PSCell is not a baseline configuration. In DC context, MeNB may also be given priority over SeNB. In some cases, eIMTA configuration of any of the Scell(s) may be used as baseline eIMTA configuration.

In some embodiments, the eIMTA configuration of a serving cell belonging to certain frequency range (e.g. below 1 GHz) or to certain band (e.g. lowest frequency band) or to certain range of bands (e.g. any band between 1-2 GHz) may be used as baseline for other cells.

Such a rule may also be pre-defined or configured at the communication device 406 by the network node 402. The communication device 406 based on such rule determine the eIMTA configuration(s) to be used for different serving cells.

Priority Based on UL and/or DL Data Transmissions eIMTA configuration of a particular serving cell may be used as baseline eIMTA configuration based on UL and/or DL data transmission. As an example the eIMTA configuration of the serving cell with highest DL and/or UL data transmissions may be used as baseline eIMTA configuration. This eIMTA configuration may be applied or configured also for other serving cells. The data transmission may be determined based on buffer size, communication device 406 bitrate or throughput measured over certain time etc.

Priority Based on Transmission Bandwidth eIMTA configuration may be taken as the baseline eIMTA configuration depending on bandwidth of the serving cells and applied to the serving cells of other component carrier(s).

For example the eIMTA configuration of serving cell on carrier with higher bandwidth may be taken as the baseline eIMTA configuration and applied to the serving cells of other component carrier(s).

Priority Based on Link Quality of any of the Carriers eIMTA configuration may be defined considering the link quality status of any or both the carriers. The link quality status may be determined based on signal measurement such as SINR, RSRQ, BLER, HARQ performance etc. As an example, a certain carrier may see loss of data and experience poor HARQ performance e.g. more frequent NACK in response to channel reception. In that case, the loss on that carrier may need to avoided or minimized with new eIMTA configuration and the updated eIMTA configuration may be used as baseline eIMTA configuration to be used by other serving cells.

Priority Based on RF Coexistence Requirement

From the RF requirement point of view, certain bands have more strict or stringent coexistence requirements compared to other bands. Thus, as one of the embodiments, the eIMTA configuration may be determined based on coexistence requirements.

For example the carrier or band with less stringent coexistence requirements may be accepted as baseline eIMTA configuration. Examples of less stringent and more stringent RF requirements are communication device 406 receiver sensitivity levels of −90 dBm and −95 dBm respectively.

Priority Based on MPR Requirement

Maximum power reduction (MPR) is one of the ways to reduce out of band (OOB) emissions from any band to any other band e.g. neighboring bands in frequency domain. The MPR is expressed in dB and is the amount by which the communication device 406 should lower its maximum power to meet the OOB emission requirements. The MPR is also interchangeably called as power backoff and may have other variants e.g. A-MPR, P-PMR etc. There are bands where MPR requirements are stricter than others. For example MPR=3 dB is considered to be stricter than MPR=1 dB. In some embodiments, eIMTA configuration of a carrier may be adopted as baseline eIMTA configuration based on MPR of the carrier or band.

As an example eIMTA configuration of a carrier within a band or band with less stringent MPR requirement may be adopted as baseline eIMTA configuration.

Determining the Allowed Set of Configurations Based on a Baseline eIMTA Configuration Any of the above embodiments may also be used to determine the eIMTA configurations of one or more carriers based on the configuration of the baseline carrier.

In some examples, one or more carriers may only be allowed to follow a set of configurations depending on the configuration of the baseline carrier. One example is the case where the PCell operates on the baseline carrier, and DL to UL interference from SCell to PCell is large. In this case the SCell is only allowed to use configurations with at least same UL subframes as in the PCell.

Procedures in a Node for Deriving the Baseline eIMTA Configuration for Intra-Band Cases As mentioned above for inter-band case, the following priority rules may also be defined for intra-band TDD-TDD deployment:

- eIMTA configuration for PCell may be applied to SCell, or eIMTA configuration of an Scell may be used as baseline eIMTA configuration.
- eIMTA configuration of the serving cell based on UL and/or DL data transmission e.g. serving cell with highest DL and/or UL data transmissions
- eIMTA configuration of serving cell based on bandwidth of carrier e.g. serving cell with higher bandwidth may be taken for the other serving cells on component carrier
- eIMTA configuration may be defined considering the link quality of serving cells on component carriers The above procedure may be implemented in a network node 402 or in a communication device 406 as described previously.

It is an advantage with the embodiments herein that it is possible to apply dynamic TDD in a variety of carrier aggregation scenarios and configurations, e.g. inter-band CA, intra-band CA, TDD-FDD CA, dual connectivity, etc. Another advantage is that the embodiments herein enable a reduction in signaling overheads. A further advantage is that the embodiments herein enable efficient use of dynamic TDD in a wide range of different operating scenarios and conditions e.g. bandwidth, RF requirements, UE bit rate requirements etc.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices. The different actions taken by the different nodes may be implemented with different circuits.

It should be noted that although terminology from 3GPP LTE has been used herein in order to exemplify some of the embodiments, this should not be seen as limiting to only the aforementioned system. As previously mentioned, other wireless systems, including WCDMA, WiMax, UMB and GSM, may also benefit from exploiting the ideas covered by the embodiments described herein.

Also note that terminology such as eNodeB and UE should be considering non-limiting and does in particular not imply a certain hierarchical relation between the two; in general "eNodeB" could be considered as first device or node and "UE" as a second device or node, and these two devices or nodes communicate with each other over some radio channel. Herein, we also focus on wireless control channel transmissions in the downlink, but the embodiments described herein are equally applicable in the uplink.

The embodiments herein are not limited to the above described preferred embodiments. Various alternatives, modifications and equivalents may be used. Therefore, the above embodiments should not be construed as limiting.

While the solution has been described with reference to specific exemplifying embodiments, the description is generally only intended to illustrate the inventive concept and should not be taken as limiting the scope of the solution. For example, the terms "network node", "communication device", "capability information", "configuration information" and "UL/DL subframe configuration" have been used throughout this disclosure, although any other corresponding entities, functions, and/or parameters could also be used having the features and characteristics described here. The solution is defined by the appended claims.

The invention claimed is:

1. A method performed by a network node for handling dynamic uplink/downlink (UL/DL) subframe configurations in communication with a communication device operating in Time Division Duplex (TDD), the method comprising:
    obtaining capability information indicating whether the communication device supports carrier aggregation, and the capability information further indicating whether the communication device supports simultaneous reception and transmission of signals on different carriers, determining, based on the obtained capability information, UL/DL subframe configurations for the communication device such that the communication device is to use different UL/DL subframe configurations for the different carriers, when at least one of the following conditions is fulfilled:

the different carriers are non-adjacent and separated in frequency above a predefined threshold level;

the different carriers form a carrier combination for which Radio Frequency (RF) requirements are not allowed for simultaneously receiving and transmitting the signals; and the different carriers form a carrier combination for which the obtained capability information indicates that the communication device is not capable of simultaneous reception and transmission of the signals on the different carriers, determining one or more cells, of the communication device, that use the determined UL/DL subframe configurations, based on a Maximum Power Reduction (MPR) requirement of the different carriers, transmitting configuration information, to the communication device, indicating the determined UL/DL subframe configurations, and transmitting an indicator, indicating the determined one or more cells, to the communication device.

2. The method according to claim 1, wherein the UL/DL subframe configurations are determined for combined frequency bands used in a Dual Connectivity (DC) operation.

3. The method according to claim 1, wherein the UL/DL subframe configurations are determined for aggregated carriers used in a Carrier Aggregation (CA) operation.

4. A network node arranged to handle dynamic uplink/downlink (UL/DL) subframe configurations in communication with a communication device operating in Time Division Duplex (TDD), the network node comprising:

a processor (P); and a memory (M), said memory (M) comprising instructions which, when executed by said processor (P), cause said processor (P) to:

obtain capability information indicating whether the communication device supports carrier aggregation, and the capability information further indicating whether the communication device supports simultaneous reception and transmission of signals on different carriers, determine, based on the obtained capability information, UL/DL subframe configurations for the communication device such that the communication device is to use different UL/DL subframe configurations for the different carriers, when at least one of the following conditions is fulfilled:

the different carriers are non-adjacent and separated in frequency above a predefined threshold level;

the different carriers form a carrier combination for which Radio Frequency (RF) requirements are not allowed for simultaneously receiving and transmitting the signals; and the different carriers form a carrier combination for which the obtained capability information indicates that the communication device is not capable of simultaneous reception and transmission of the signals on the different carriers, determine one or more cells, of the communication device, that use the determined UL/DL subframe configurations, based on a Maximum Power Reduction (MPR) requirement of the different carriers, transmit configuration information, to the communication device, indicating the determined UL/DL subframe configurations, and transmit an indicator, indicating the determined one or more cells, to the communication device.

5. The network node according to claim 4, wherein the instructions which, when executed by said processor (P), cause said processor (P) to determine the UL/DL subframe configurations for combined frequency bands used in a Dual Connectivity (DC) operation.

6. The network node according to claim 4, wherein the instructions which, when executed by said processor (P), cause said processor (P) to determine the UL/DL subframe configurations for aggregated carriers used in a Carrier Aggregation (CA) operation.

7. A method performed by a communication device for handling dynamic uplink/downlink (UL/DL) subframe configurations when operating in Time Division Duplex (TDD) in communication with a network node, the method comprising:

receiving configuration information, from the network node, indicating UL/DL subframe configurations for use by the communication device on a serving cell when the communication device is operating in carrier aggregation of different carriers, determining for which of the different carriers the received UL/DL subframe configurations are to be used, based on an indicator, received from the network node, indicating for which cells of the communication device the received UL/DL subframe configurations are to be used, wherein said cells are determined based on a Maximum Power Reduction (MPR) requirement of the different carriers, and applying the received UL/DL subframe configurations on said determined different carriers.

8. The method according to claim 7, wherein said cells of the communication device are a primary cell or at least one secondary cell.

9. The method according to claim 8, wherein when the received UL/DL subframe configurations are associated with one or more secondary cells, the communication device determines that the received UL/DL subframe configurations are to be used for the different carriers in the primary cell and the one or more secondary cells.

10. The method according to claim 7, wherein when the received UL/DL subframe configurations are associated with a primary cell, the communication device determines that the received UL/DL subframe configurations are to be used for the different carriers in the primary cell only.

11. The method according to claim 7, wherein when the received UL/DL subframe configurations are associated with more than one cell comprising a primary cell, the communication device determines that the received UL/DL subframe configurations are to be used for the different carriers for all cells of the communication device.

12. A communication device arranged to handle dynamic uplink/downlink (UL/DL) subframe configurations when operating in Time Division Duplex (TDD) in communication with a network node, the communication device comprising:

a processor (P); and a memory (M), said memory (M) comprising instructions which, when executed by said processor (P), cause said processor (P) to:

receive configuration information, from the network node, indicating UL/DL subframe configurations for use by the communication device on a serving cell when the communication device is operating in carrier aggregation of different carriers, determine for which of the different carriers the received UL/DL subframe configurations are to be used, based on an indicator, received from the network node, indicating for which cells of the communication device the received UL/DL subframe configurations are to be used, wherein said cells are determined based on a Maximum Power Reduction (MPR) requirement of the different carriers, and apply the received UL/DL subframe configurations on said determined different carriers.

13. The communication device according to claim 12, wherein said cells of the communication device are a primary cell or at least one secondary cell.

14. The communication device according to claim 13, wherein when the received UL/DL subframe configurations are associated with one or more secondary cells, the instructions which, when executed by said processor (P), cause said processor (P) to determine that the received UL/DL subframe configurations are to be used for the different carriers in the primary cell and the one or more secondary cells.

15. The communication device according to claim 12, wherein when the received UL/DL subframe configurations are associated with a primary cell, the instructions which, when executed by said processor (P), cause said processor (P) to determine that the received UL/DL subframe configurations are to be used for the different carriers in the primary cell only.

* * * * *